March 6, 1962 W. ZÁRUBA 3,023,790
AUTOMATIC SELF-SERVING BREWER OR DISPENSER
FOR COFFEE OR OTHER FLUID SUBSTANCES
Filed Nov. 6, 1959 7 Sheets-Sheet 3
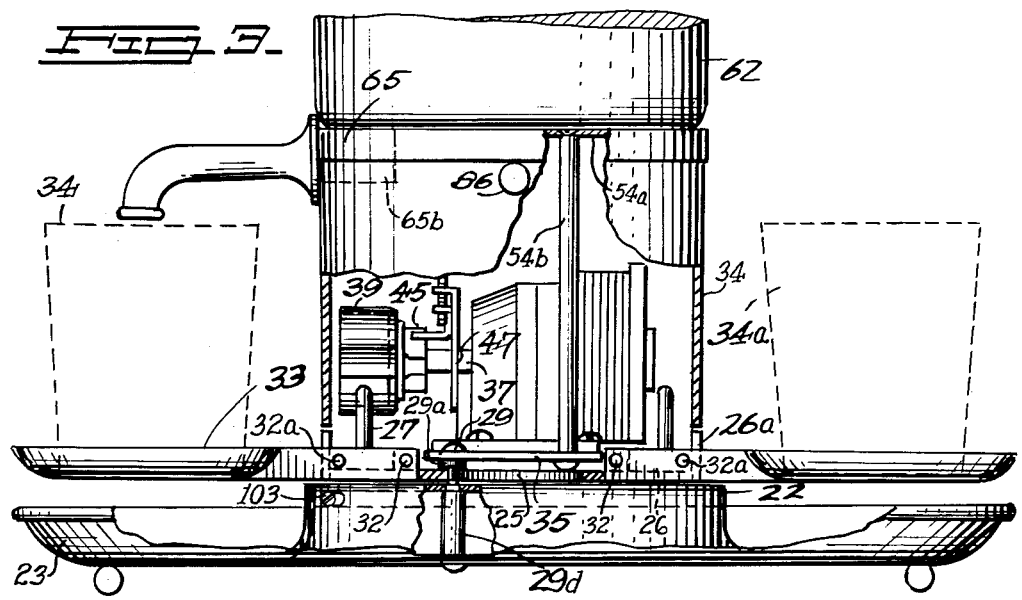
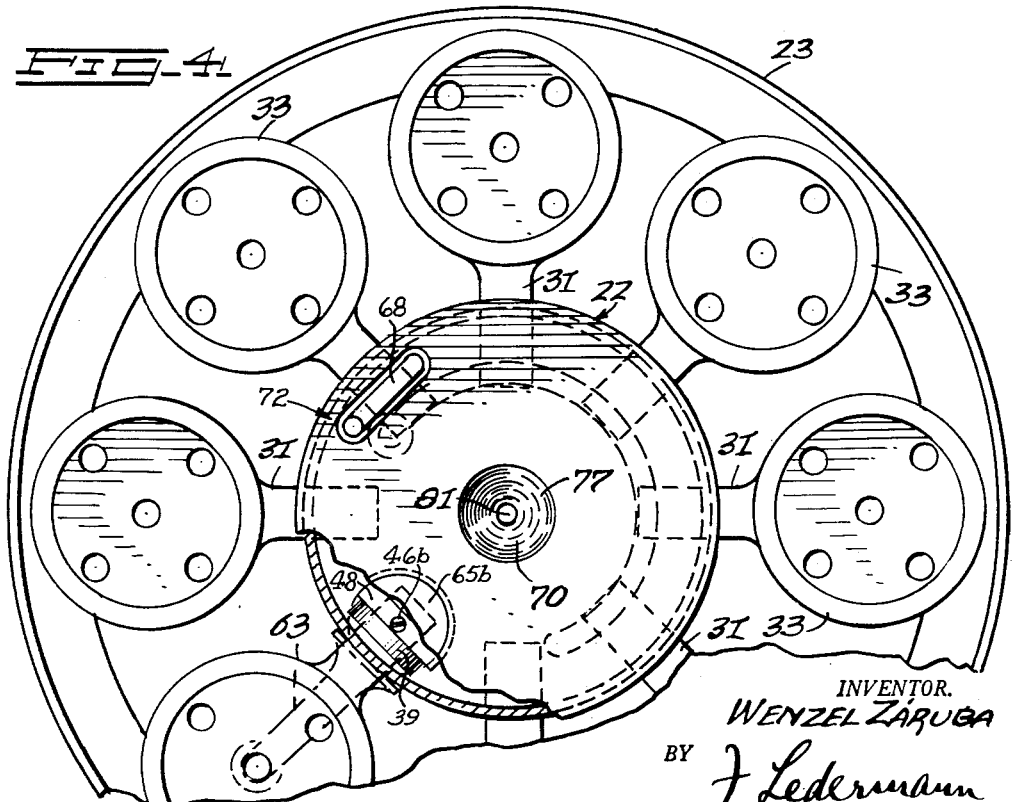
INVENTOR.
WENZEL ZÁRUBA
BY J. Ledermann
ATTORNEY.

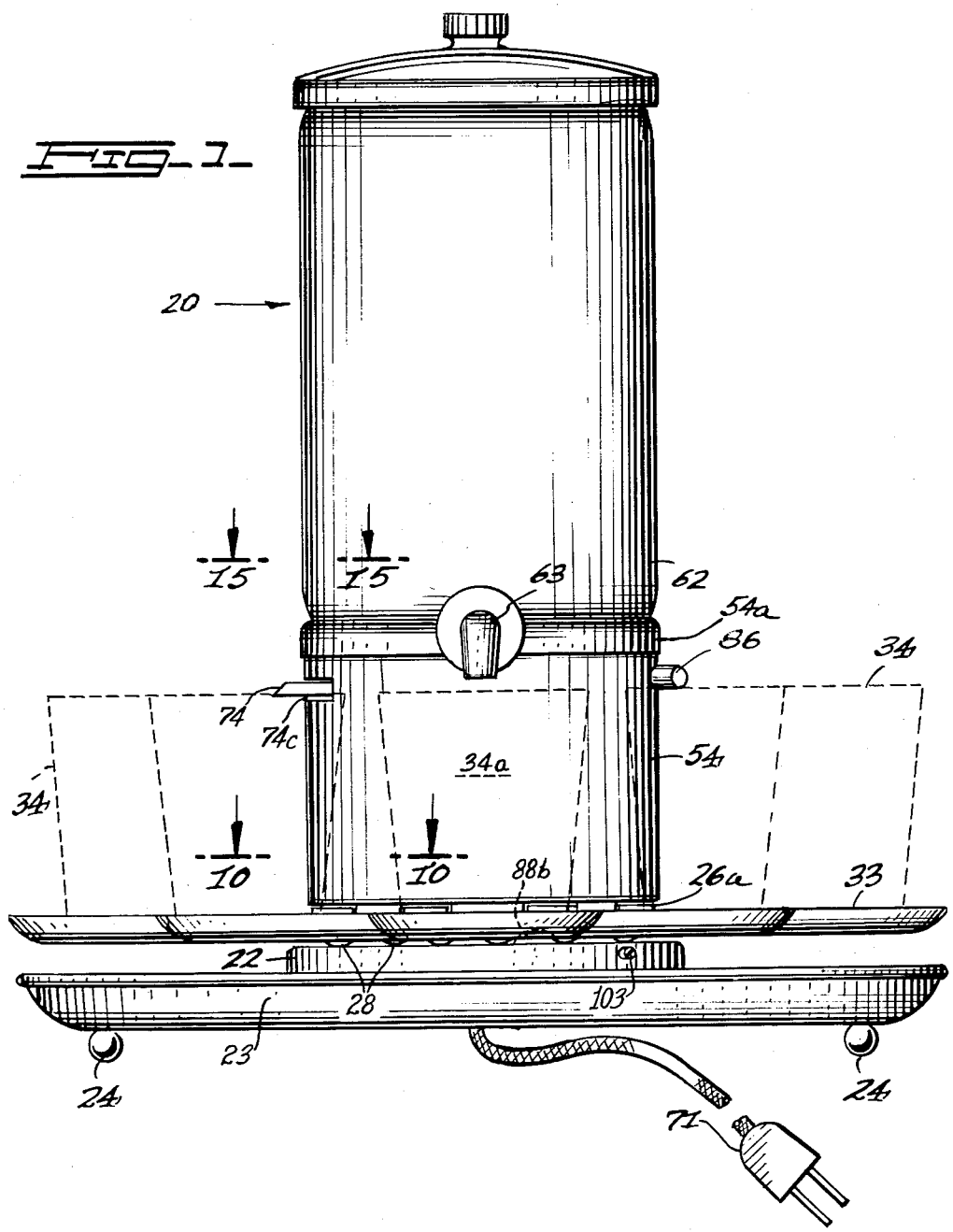
March 6, 1962    W. ZÁRUBA    3,023,790
AUTOMATIC SELF-SERVING BREWER OR DISPENSER
FOR COFFEE OR OTHER FLUID SUBSTANCES
Filed Nov. 6, 1959    7 Sheets-Sheet 1
INVENTOR.
WENZEL ZÁRUBA
J. Ledermann
ATTORNEY.

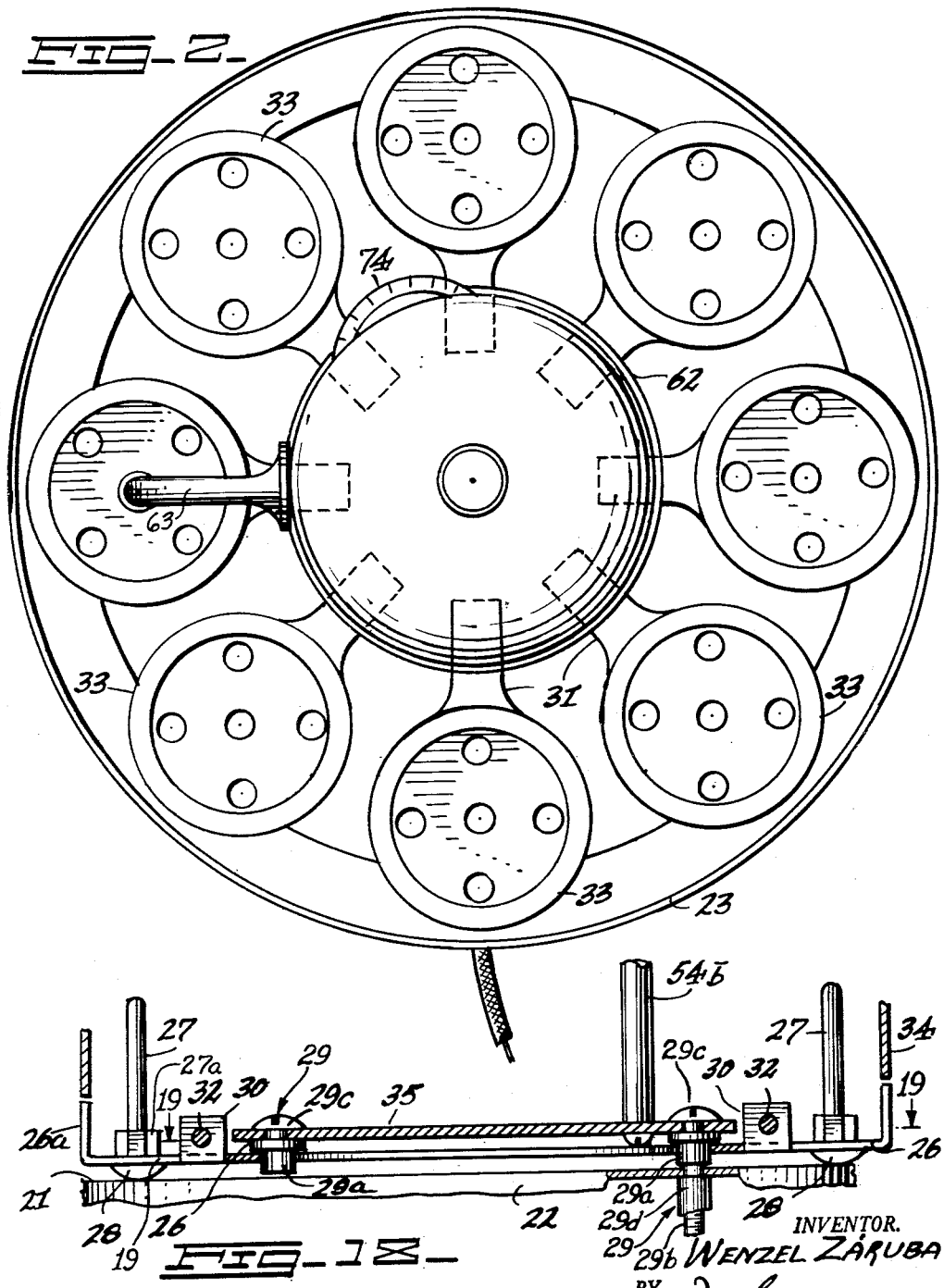

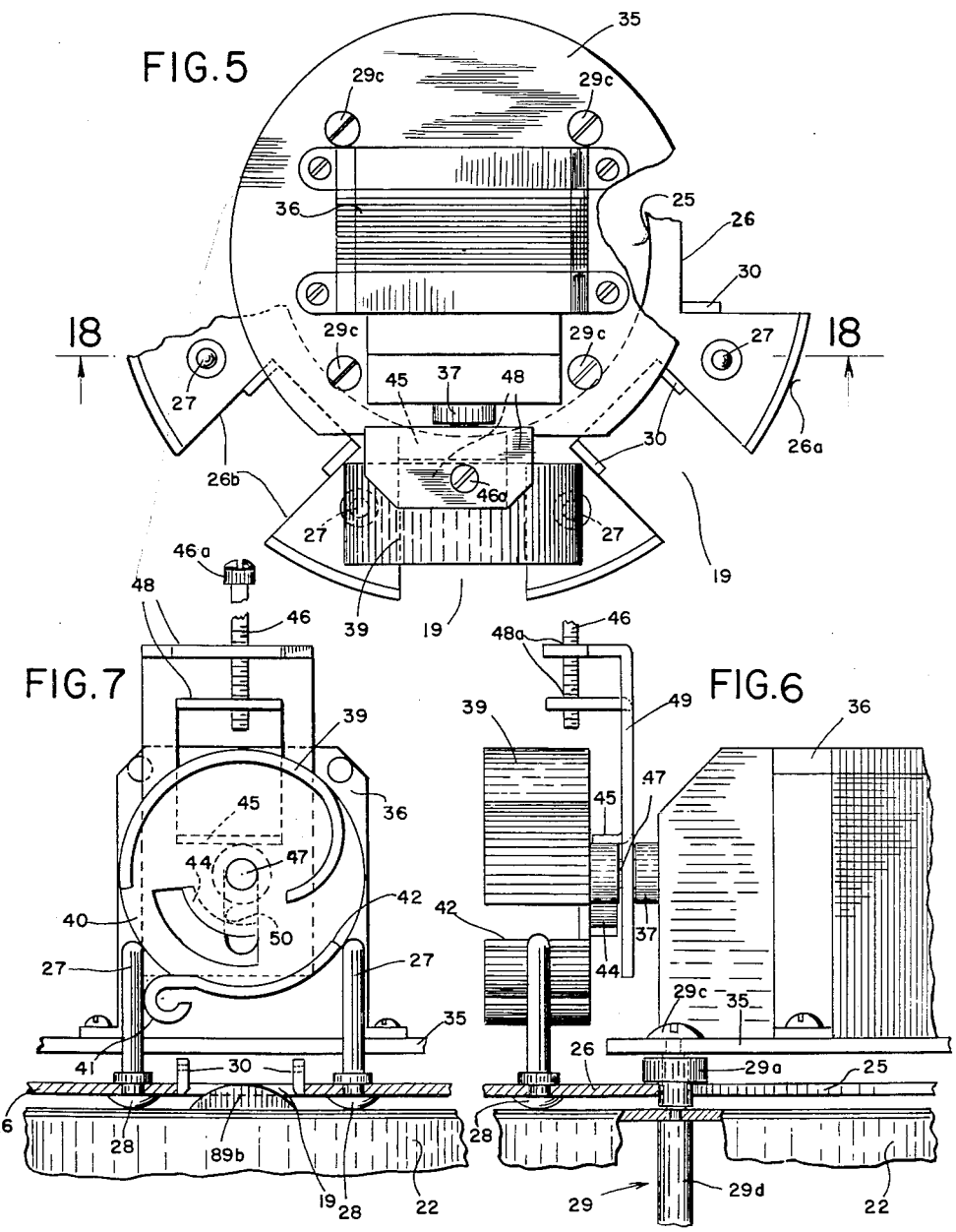

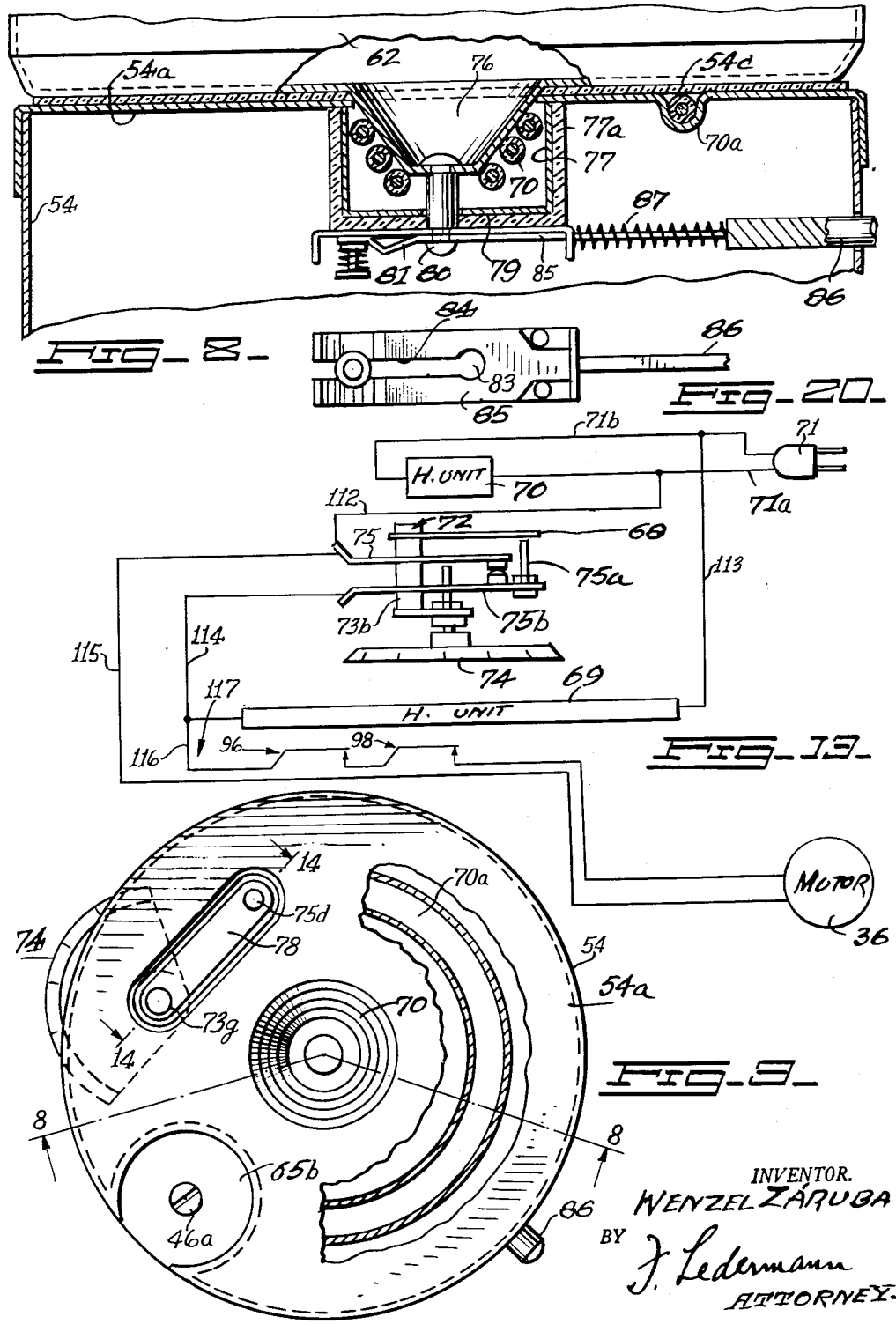

March 6, 1962
W. ZÁRUBA
3,023,790
AUTOMATIC SELF-SERVING BREWER OR DISPENSER
FOR COFFEE OR OTHER FLUID SUBSTANCES
Filed Nov. 6, 1959
7 Sheets-Sheet 6
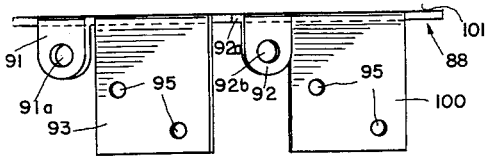
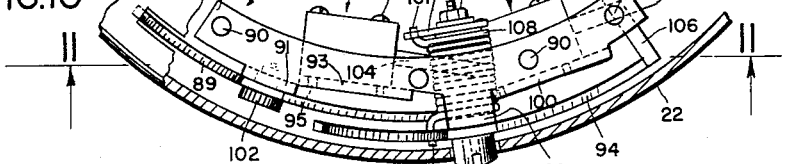
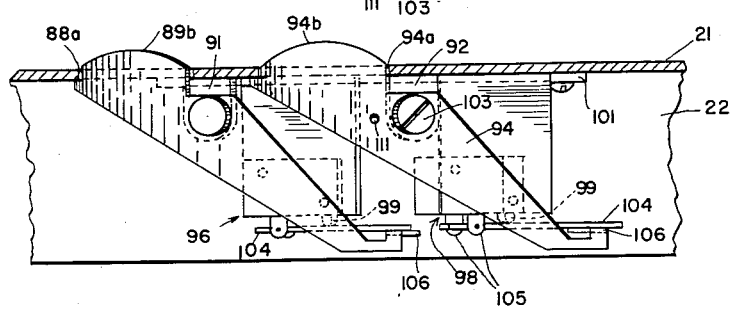
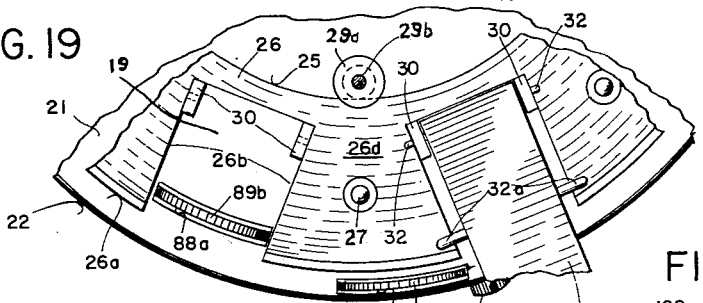
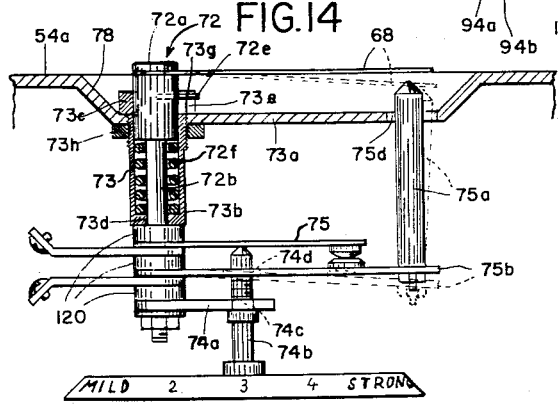
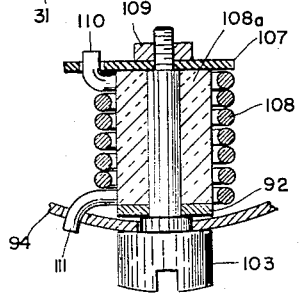
INVENTOR.
WENZEL ZÁRUBA
BY J. Ledermann
ATTORNEY

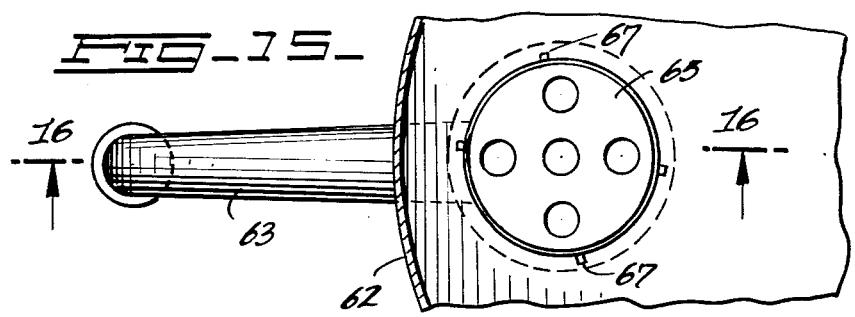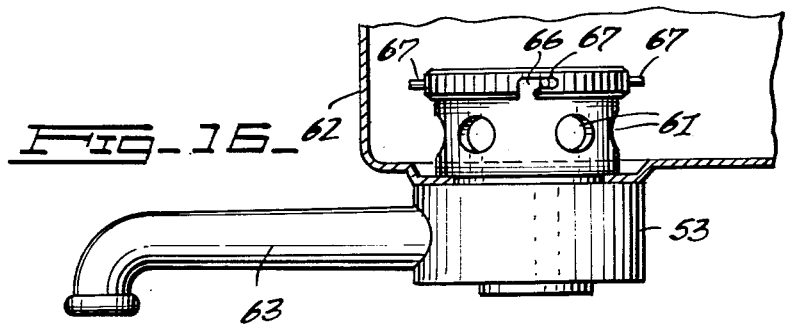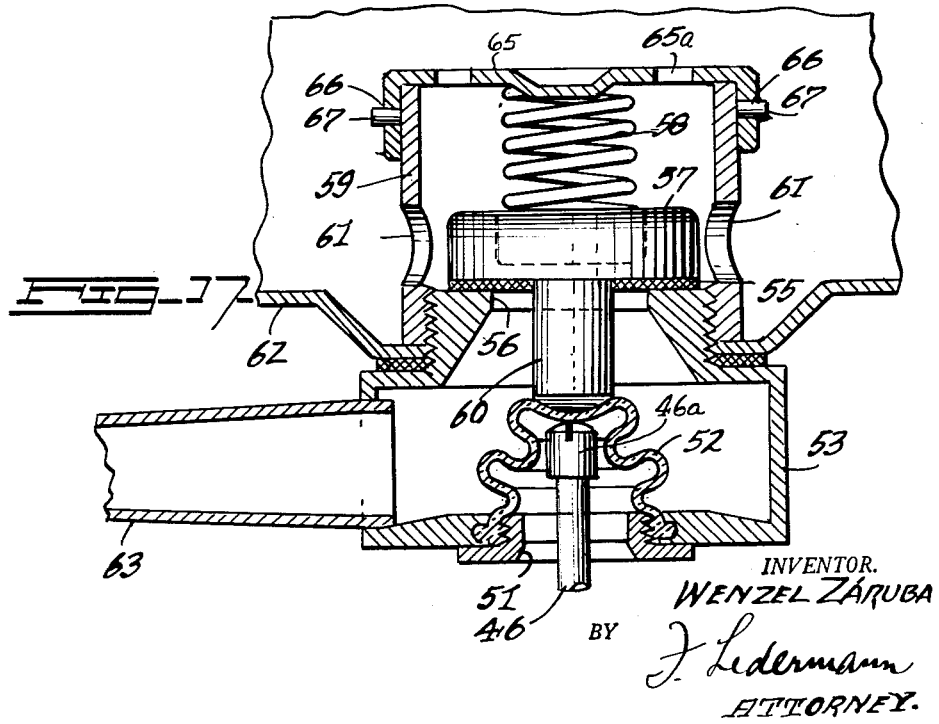

United States Patent Office 3,023,790
Patented Mar. 6, 1962

3,023,790
AUTOMATIC SELF-SERVING BREWER OR DISPENSER FOR COFFEE OR OTHER FLUID SUBSTANCES
Wenzel Záruba, 102 Lanza Ave., Garfield, N.J.
Filed Nov. 6, 1959, Ser. No. 851,328
10 Claims. (Cl. 141—82)

This invention relates to automatic beverage or liquid brewing or heating and dispensing devices, and the primary object is the provision of certain new and useful improvements whereby the entire operation is automatic from start to finish without requiring any attention on the part of the operator.

Although it is not intended to limit the invention to the application of a coffee brewer and dispenser, for the purpose of illustration and by way of example, the drawings illustrate and the description refers to an automatic coffee brewer and self-serving or dispensing device.

Essentially the device consists of a coffee container or pot and a support therefor, with means whereby the pot is automatically heated and the heat is automatically reduced to a lower temperature when the coffee has been brewed, together with a step-by-step rotatable cup supporting series of arms which pass in sequence under the spout of the pot and means for opening a valve in the pot discharge and maintaining it open long enough to fill the cup under it. Means is further provided for then automatically rotating the next cup-supporting arm into position under the spout and the operation is thus continued until all of the cups have been filled. The cup-supporting arms are carried on an annular member which is rotated in the manner mentioned. Additionally, means is provided to permit opening of the spout discharge valve only when an empty cup is positioned under it, and for stopping rotation of the annular member when a filled cup is positioned in a position next preceding that under the spout.

The following description sets forth the details by which the device functions in the manner briefly described above, both of construction and operation, and as illustrated in the accompanying drawings.

Referring briefly to the drawings, FIGURE 1 is an elevational view of the device including the coffee pot positioned thereon;

FIGURE 2 is a top plan view of the same;

FIGURE 3 is a fragmentary elevational view of the device taken at right angles to FIGURE 1, with parts broken away and partly in section;

FIGURE 4 is a fragmentary top plan view of the device with the coffee pot removed and with parts broken away and partly in section;

FIGURE 5 is a fragmentary enlarged top plan view of certain interior working parts of the device which provide for the sequential movement of a plurality of cup-supporting arms into association with the dispensing spout of the pot;

FIGURE 6 is a fragmentary side elevational view of FIGURE 5;

FIGURE 7 is a front view of the apparatus shown in FIGURE 6;

FIGURE 8 is an enlarged fragmentary sectional view taken on the line 8—8 of FIG. 9;

FIGURE 9 is a top plan view of the pot-supporting housing per se of the present invention with the pot removed and with the thermostat unit omitted;

FIGURE 10 is an enlarged fragmentary sectional view taken along line 10—10 of FIGURE 1, with parts including the top of the base omitted and other parts broken away and partly in section;

FIGURE 11 is a fragmentary sectional view taken along line 11—11 of FIGURE 10;

FIGURE 12 is an enlarged fragmentary sectional view taken along line 12—12 of FIGURE 10;

FIGURE 13 is a schematic wiring diagram of the present invention;

FIGURE 14 is an enlarged fragmentary view showing the thermostat of the device consisting in part of a section taken on the line 14—14 of FIG. 9;

FIGURE 15 is an enlarged fragmentary sectional view taken along line 15—15 of FIGURE 1;

FIGURE 16 is a fragmentary sectional view taken along line 16—16 of FIGURE 15;

FIGURE 17 is a more greatly enlarged fragmentary sectional view also taken on the line 16—16 of FIGURE 15 but showing additional parts in section;

FIGURE 18 is a fragmentary sectional view taken along line 18—18 of FIGURE 5;

FIGURE 19 is partly a plan view looking down upon the turntable and partly a sectional view on the line 19—19 of FIG. 18;

FIGURE 20 is a fragmentary bottom plan view of certain parts of the assembly shown in FIGURE 8; and FIGURE 21 is a plan view of a bracket for supporting the operating parts shown in FIGS. 10 and 11.

Referring in detail to the drawing, an apparatus 20 made in accordance with the present invention is shown to include a cylindrical base 22 open at the bottom and provided with a roof 21. The base 22 is shown integral with an enlarged circular tray 23 supported on feet 24. An annular plate 26 whose internal circular cut-out is shown at 25, has an upstanding circumferential flange 26a. A plurality of equidistant circumferentially spaced pins 27 extend upward through the plate 26 and have rounded heads 28 on the underside of the plate, being retained in position by nuts 27a screwed upon threads, not shown, on the pins, or by other means. The plate 26 is mounted concentrically on the roof 21 for rotation about its axis.

Vertical securement members 29 secure a motor plate 35 in position above the plate 26. Each member 29 consists of a screw bolt 29b (FIG. 18) having a head 29c positioned above the plate 35, a flanged roller 29a positioned under the plate 35 on the bolt 29b, and, below the roof 21, a threaded sleeve or nut 29d tightened against the roof 21. The flange of the roller rests on the edge of the cut-out 25. Thus this structure positions the plate 26 for rotation about its axis, as stated above.

The plate 26 has circumferentially spaced radial slots 19 equal in number to the number of pins 27, each slot being positioned intermediate a pair of adjacent pins. At the radially inward end of each slot 19, a pair of upstanding ears 30 extend from the opposite edges 26b of the slot. Each such pair of ears pivotally supports the innermost end of a radially outwardly extending arm 31, by means of pivot pins 32. Stop studs 32a carried by the arms 31 engage the upper surfaces of the edges 26b of the slots 19 in the plate 26 and thus support the arms, in their lowermost position, a predetermined distance above the surface of the plate 26. The outermost end of each arm 31 is provided with a saucer-shaped disc 33 for supporting a container or cup 34. A motor 36 which includes a gear reduction box, not shown in detail, is mounted upon the motor plate 35 and, together with other parts driven by the motor, is contained within a cylindrical housing 54.

As is more clearly shown in FIGS. 3 and 5–7 of the drawing, the outermost end of the drive shaft 37 of the motor is provided with a generally hollow substantially cylindrical drive member having an opening 40 at one side defining a radially outwardly projecting bead 41, and a recess 42 at approximately the diametrically opposite side for providing clearance with the next adjacent drive pin 27 of the annular plate 26. The diameter of the drive member or cylinder 39 is equal to the distance between the circumferentially spaced drive pins 27 of the annular plate 26. Thus, after the bead 41 passes the preceding drive pin 27 during clockwise rotation of the shaft 37, as shown in FIGURE 5, the drive member 39 will rotate one-half of a complete turn (as will the shaft 37) before the bead 41 engages the next drive pin 27, which drive pin is received within the opening 40 and thus driven in the direction of the arrow shown in FIGURE 5 by the continued rotation of the drive cylinder 39, to the position of the immediately preceding drive pin.

A cam 44 integral with the drive cylinder 39 is in engagement with a horizontal ear 45 on a substantially vertical follower plate 49. Directly above the ear 45 are two vertically spaced ears 48 provided with aligned threaded openings 48a in which a screw 46 registers. Thus, immediately after the annular plate 26 has been rotated the distance between two mutually adjacent drive pins 27, and during the second one-half of a turn of the shaft 37 the cam 44 comes into play with the follower 49 to cause the plunger 46 to move upwardly in a substantially vertical direction. The plate 49 is provided with an elongated vertical slot 50 of a width less than the diameter of the shaft 37, through which a reduced portion 47 of the motor shaft 37 extends, such reduced shaft portion defining a groove which positions the plate 49 longitudinally of the shaft for vertical movement radially thereof.

The head 46a of the plunger 46 is received within an opening 51 in the base 53 of a valve housing that is secured to the bottom of the beverage container 62. The valve housing 53 is provided with an imperforate flexible and resilient bellows-like sleeve 52, which allows the entry of the plunger 46 without leakage of any fluid. The screw plunger 46 thus acts upon the stem 60 of a valve member 57 that is normally in a seated closed position upon a valve seat washer 55 that encircles a valve opening 56 which communicates with the interior of the housing 53 and an inner or upper extension valve housing 59. The inner valve housing 59 is provided with ports 61 that communicate with the interior of the beverage container 62. However, a coil spring 58 normally urges the valve closure member 57 toward seated engagement with the valve seat 54, thus blocking flow of fluid into the lower housing 53 and outwardly through the spout 63. On the other hand, as the screw plunger 46 is moved upwardly by the action of the cam plate 44 as previously mentioned, fluid is allowed to pass outwardly through the spout 63 from the interior of the container 62. In order to provide for the cleaning of the valve parts, the inner housing 59 is provided with a removable cap 65 having passages 65a therethrough and provided with bayonet slots to which received radially outward extending lock pins 67 carried by the housing 59. The well 53 is eccentric to and extends below the bottom of the pot, and it registers in a complementary recess 65b in the roof 54a for properly positioning the pot on the roof.

The cylindrical housing 54 which has a top plate or roof 54a encloses the motor and operating parts and is supported by posts 54b (of which but one is shown, FIGS. 3 and 18) carried upon the motor plate 35. This top plate 54a is provided with a layer 54c (FIG. 8) of asbestos which has cutouts to expose predetermined portions of the top plate to the coffee pot or container 62. A main low resistance and low inductance heating coil 69 is secured in a groove 70a in the roof 54a, while a high resistance warming coil 70 is wound in a conical configuration within an asbestos well 77a lined on the inside with an aluminum shell 77 to keep heat away from the motor parts.

Referring to FIG. 14, the roof 54a of the housing 54 has a well or depression 78 whose floor is shown at 73a. This floor has at one end thereof an opening 73g through which a barrel 73, open at the top, is inserted downwardly. The barrel has a collar 73c integral with its top resting on the floor 73a, and a threaded washer 73h screwed against the underside of the floor clamps the barrel in suspended position from the floor. The barrel has a reduced opening 73d through the bottom thereof, and the collar 73c has a vertical radial slot 73e therein. A plunger 72 consists of a head 72a and a stem 72b, the latter being slidable in the opening 73d. A spring 72f normally urges the plunger head upward to the position shown in FIG. 14, i.e., above the level of the roof 54a. A pin 72e extending radially from the head 72a registers slidably in the slot 73e and serves as a limit stop to the downward movement of the plunger. The head 72a has extending therefrom, from a position just below the top thereof, a heat-sensitive strip 68 which normally extends horizontally, as shown in full lines, FIG. 14, and is designed to flex downward under the effect of heat into, say, the position shown in broken lines. This strip extends to the right of the plunger head, FIG. 14, a distance substantially equal to the length of the floor 73a. Secured to the lower end of the stem 72b in spaced relationship by means of threaded (not shown) washers 120, are two contact fingers 75 and 75b which are normally in mutual contact, as shown in FIG. 14. The upper finger 75 is normally flexed as stated, to contact the finger 75b. The lower finger 75b is longer than the finger 75 and has, secured to its extremity, an upright post 75a of insulating material which projects upward through an opening 75d in the floor 73a; the upper end of this post is in contact with the strip 68. Secured to the bottom of the stem 72b in the vertical plane of the depression 78 and the fingers 75 and 75b, is a horizontal support 74a provided with a threaded opening 74f in which a vertical screw 74b threadably registers and passes upward through an enlarged opening 74d in the lower finger 75b. Concentric and rigid with the screw 74b is a graduated sector 74 which partly extends through a slot 74c, FIG. 1, in the housing 54.

It is now apparent that when the pot 62 is set in position on the roof 54a, its weight will depress the plunger head 72a downward to the level of the said roof, and the plunger will carry down with its the entire thermostat assembly carried by the plunger below the barrel 73b. For the sake of simplicity this lowered position of the plunger and the thermostat elements is not shown. As the pot heats up, the strip flexes downward and thus pushes the post 75a downward to tend to lower the finger 75b out of contact with the finger 75. Assuming the original setting of the control sector 74 to be that shown in FIG. 14, the lowering of the finger 75b out of contact with the finger 75 will occur at a relatively low temperature. However, if the sector is turned so as to lower the screw 74b, the finger 75 will, owing to its normal flexing, follow the screw tip downward and hence also lower the post 75a. Consequently the pot will have to rise to a higher temperature before the strip 68 can bend sufficiently to move the finger 75b downward out of contact with the finger 75. Thus the brewing time of the coffee may be increased or decreased with consequent variation in the strength of the brew.

The reason for having the pot depress the plunger 72 is as follows. As the pot heats up, and as is well known, the bottom of the pot may arch upward or downward. If the position of securement of the strip 68 with respect to the pot bottom were fixed and the latter arched upward, then the said distance would be increased; conversely, if the pot bottom arched downward the said distance would be diminished. In either such case the alteration of the said distance would prevent the strip from being consistently responsive to the temperature of the bottom of the pot so that the contact fingers would separate too late or too soon.

The container 62 is detachably mounted upon the top wall 54a by means of a depending pin 79 having an annular groove 80 which is engageable within an aperture 83 at one end of a slot 84 in a conventional latch plate 85 that is slidably mounted upon the base beneath the asbestos housing 77a. After the lowermost end of the pin 79 is received within the aperture 83, the outward movement of the plate 85 under the action of the compression coil spring 87 is operative to move the narrower slot portion 84 thereof into the annular groove 89, thus locking the pin 79 into the base. A handle in the form of a plunger 86 connected to the latch plate 85 is accessible from the outside of the housing 54, thus enabling the parts to be released whenever desired.

A unitary bracket 88 is used to mount the control switches of the device inside the base portion 22; this structure is illustrated in FIGS. 10, 11 and 21. The bracket 81 consists, first, of an arcuate plate or strip 101. By means of suitable holes, such as shown at 90, in this strip, it is secured against the underside of the roof 21. From the radially outward end of the strip, a tongue 91 extends downward at right angles, or vertically. Spaced from the tongue 91, the strip has an outward radial extension 92a from whose extremity a second tongue 92 extends vertically downward. From the said edge of the strip 101 two spaced plates 93 and 100 also extend vertically downward, the plate 93 being positioned between the tongues 91 and 92. The plates 93 and 101 have suitable threaded holes 95 therein. A normally open pressure sensitive switch contained in a housing 96, is secured against the back of the plate 93 by screws 97 registering in the openings 95. A second but normally closed pressure sensitive switch contained in a housing 98 is similarly positioned and mounted against the plate 100. The switch housings carry on their bottoms a spring propelled button or plunger 99; in the case of the switch 96, the button 99 is adpated to close the switch when the button is pushed in, and in the case of the switch 98 the switch is closed when the button is pushed in. Both of these switches are conventional, and for the sake of convenience they will hereinafter be indicated by the reference numerals applied to their housings, i.e., 96 and 98.

The two switches are actuable by identical arms 89 and 94; the former is pivoted on a pin 102 passed through an opening 91a in the tongue 91, and the latter is pivoted on a screw bolt 103 passed through an opening 92b in the tongue 92. Each switch 96, 98 has on its bottom a pair of spaced ears 105 in which one end of a rod 104 is pivoted. Each of the arms 89, 94 extends angularly downward, FIG. 11, and at its lower extremity is a rearwardly extending hook 106 passing under and supporting the outer end of the rod 104 in position close to or in contact with the button 99. The hook 106 has been omitted from the arm 89 in FIG. 10, for the sake of clarity, but it would appear in that figure similarly to the hook 106 on the arm 94.

The upper end 89b of the switch arm 89 is rounded on top and projects upward through a slot 89a in the roof 21; similarly, the rounded upper end 94b of the arm 94 projects upward through a slot 94a. The positions of the pivots 102 and 103 of the switch arms, shown in FIG. 11, are the normal inactive positions thereof; after the projections 89b and 94b have been depressed, upon release they reassume the said positions.

Provision is made for varying the force or weight required to depress the end 94b of the arm 94 to close the switch 98, as follows. Between a washer 107 and the slotted head of the screw bolt 103, a bushing 108a surrounds the bolt and a coiled torsion spring 108 surrounds the bushing, a suitable nut 109 being provided on the rear end of the bolt, FIG. 12. The rear end 110 of this spring is deformed and engaged in an opening in the washer, and the front end 111 of the spring is deformed and engaged under the arm 94 to the left, FIG. 11, of the pivot bolt 103, thus normally urging the end 94b upward. By turning the bolt 103 in one direction or the other, the tension of the spring is altered so that a greater or lesser weight is required upon the arm end 94b in order to depress the latter and thus open the switch 98.

As shown in FIG. 13, a plug 71, adapted to be connected to an outlet socket, has power leads 71a and 71b, directly across which the warming coil 70 is bridged so that it is at all times energized while the device is plugged in. A lead 112 connects one end of the heater unit 69 with the power lead 71b, and a lead 114 connects the other end of this unit with the contact finger 75b. Thus a sub-circuit which includes both contact fingers 75 and 75b and the unit 69 in series is also bridged across the power leads, so that the unit 69 is energized when the contact fingers are mutually in contact.

A second sub-circuit 117 contains the two switches 96 and 98 and the motor 36 in series; this circuit has one lead 115 connected to the contact finger 75 and the other lead 116 thereof connected to the lead 114. Thus, when the thermostat fingers 75 and 75b are in mutual contact they provide a shunt or short across the sub-circuit 117 so that the motor cannot be energized even when both switches 96 and 98 are closed. However, when the fingers 75 and 75b are separated, current will flow through the sub-circuit 117 from the lead 71a through the lead 112, through lead 115, through lead 116, through the heat unit 69 and back to the lead 71b. As is well known, electric heating elements which serve a purpose such as that of the unit 69, have relatively low resistance and practically no inductance; hence the interposition of the unit 69 in series with the motor 36 will not noticeably diminish the power available at the motor.

The operation of the device is as follows. The first of a series of cups 34 (counting counter-clockwise, FIG. 2) is placed on the disc 33 which is positioned directly under the spout 63, for example, the cup 34a, FIG. 1. Owing to the weight of this empty cup bearing upon the projecting end 89b of the arm 89, the cup-supporting arm 31 will be depressed until the pins 32a thereon are stopped by the edges 26b of the slot 19 in the annular disc 26 (FIG. 19). Depression of the end 89b of the arm 89 causes closing of the switch 96, and with both switches thus closed the circuit through the motor 36 is closed. It is to be noted in the wiring diagram, FIG. 13, that the switches 96 and 98 are shown purely schematically in their normal inactive positions and to indicate that switch 96 is normally open and switch 98 is normally closed. As will be explained below, at the start of the operation of the device, the shaft 37 is positioned at the end of the first half of its turn or cycle and ready to start its second turn. Hence, with the motor energized, during the second half turn of the motor shaft 37 the latter will cause cam 44 to lift the stud 46 and then lower it, thus causing discharge of liquid from the spout to fill the cup. Then the shaft 37 begins its next complete cycle of rotation, and during the first half thereof the member 39 will rotate the annular plate 26 through an arc equal to the distance between successive pins 27, thereby placing the next successive empty cup under the spout; the second half turn of the shaft 37 again causes filling of the second cup. This operation is continuous until a filled cup finally arrives in the position just antecedent to that under the spout. The weight of this filled cup will cause depression of the projecting cam 94b of the switch arm 94 and thus open the switch 98 to stop the motor. Hence, the cup capacity of the device is one less than the number of arms 31, or discs 33. While the plate 26 is turning, the projection 89b, lying under this plate, remains depressed by the passage thereover of the radial portion 26d between successive slots 19. The projection 94b, however, is not thus affected since it lies radially outward from the circumferential edge of the plate 26.

The reason why the first cup placed under the spout will be filled with liquid from the container when the motor starts owing to closing of the thermostat switch, is as follows. When the device was last used, the filled cup which arrived at the next preceding position to that under the spout, caused opening of the switch 94 and thus stopped the motor immediately after its arm 31 was fully positioned on the projection 94b. In other words, the motor was stopped immediately after the shaft 37 had completed the second half-cycle of rotation mentioned above, that is, the half turn of the shaft 37 which causes turning of the plate 26 through an arc. This leaves the device in condition to fill the cup under the spout, when again in use, upon opening of the thermostat switch.

It will now be recognized that by arranging the circuit in the manner shown in FIGURE 13, a beverage, such as coffee, can be brewed to any desired strength within the vessel 62, following which the thermostat will close the electrical circuit through the motor 36, causing the annular plate 26 to be intermittently rotated with respect to the dispensing spout 63 of the container. A signal device, not shown, may be provided so that as soon as the plate 26 has ceased to rotate, the completion of the filling of all of the drinking vessel may be signaled, in a completely automatic manner. The warming coil 70 remains energized at all times by the line 71, thus retaining the proper temperature of the beverage for subsequent filling operations.

While this invention has been described with particular reference to the construction shown in the drawing, it is to be understood that such is not to be construed as imparting limitations upon the invention, which is best defined by the claims appended hereto.

What I claim as new and desire to protect by Letters Patent of the United States is:

1. A device of the class described comprising a circular base, an annular turntable having a circular opening therethrough mounted on and concentric with the base, a given plurality of circumferentially equidistantly spaced radial cup-supporting arms adapted to have cups mounted thereon pivoted to the turntable, a cylindrical housing open at the bottom having a roof closing the top thereof positioned with the bottom of the housing above the turntable and concentric therewith, a plate positioned above the turntable within the confines of said housing, circumferentially spaced support members equidistant from the axis of the base extending from the base through said circular opening supporting said plate and contacting the circumferential edge of said circular opening, support members extending from said plate supporting said housing, an electric motor having a low speed output shaft radially positioned with respect to the turntable mounted on said plate, a pot having an outlet well in the bottom thereof and a discharge spout extending radially from the well and the pot, a heating element in said roof, a normally lowered and closed vertically movable valve mounted in the well between the interior of the pot and the spout normally shutting off communication between the spout and the pot including means normally urging the valve to lowered position, the pot being removably mounted on said roof in a position concentric with said housing and with the valve and the motor shaft and the spout lying in a common vertical plane, means partly on said shaft and partly on the turntable for rotating the turntable through an arc equal to the arcuate distance between adjacent arms during the first half-cycle of rotation of the shaft, a vertically movable normally lowered stud extending upward in alignment with said valve for alternately raising and opening the valve and lowering and closing the same, means on said shaft for first raising and then lowering said stud during at least a part of the second half-cycle of rotation of the shaft to alternately open and close the valve, a normally open first switch secured to said base including a switch actuating arm adapted to be depressed by a cup-supporting arm plus the weight of an empty cup thereon, said actuating arm having a portion thereof projecting upward above the base, said upwardly projecting portion being positioned in said vertical plane, a second normally closed switch secured to the base including a switch actuating arm adapted to be depressed to open the same having a portion thereof projecting upward above said base, said second switch including adjustable means resisting depression of the actuating arm thereof except by a force equal to the weight of the cup-supporting arm plus the weight of an at least partially filled cup, the projecting portion of said second switch arm being positioned a distance of said arc from said first-named projecting portion measured in a direction opposite to the direction of rotation of the turntable, both of said projecting portions having their upper extremities lying in the circumferential path of movement of the cup-supporting arms for depression thereof by an arm positioned thereover, a thermostat carried by said housing in proximity to said roof including a pair of normally interengaged contact fingers, a first sub-circuit consisting of said motor and said first and second switches in series, a second sub-circuit consisting of said heating element and said contact fingers in series, power leads having said second sub-circuit connected across the same with one terminal of said element connected to one of said fingers, said first sub-circuit having one terminal thereof connected to said one of said fingers and the other terminal thereof connected to the other of said fingers.

2. A device according to claim 1, said well having a housing enclosing the same and provided with a downward extension below the bottom of the pot and eccentric to the axis of the pot, said roof having a depression therein positioned eccentric to the axis of the roof complementary to said downward extension in which the extension registers.

3. A device according to claim 2, having in combination with said eccentric extension of the pot and said eccentric depression in the roof guide means for positioning the pot with said spout in said vertical plane consisting in an axial downward extension from the bottom of the pot and a complementary axial depression in said roof in which the axial extension of the pot registers.

4. A device according to claim 3, having a second heating coil mounted in said axial depression in said roof and surrounding said axial extension of the pot, said second heating coil being connected across said power leads.

5. A device according to claim 1, having means for releasably locking the pot on said roof.

6. A device of the class described comprising a base having a turntable mounted thereon, the turntable having a plurality of circumferentially equidistant radial cup-supporting arms adapted to have cups mounted thereon, said arms being pivoted to the turntable on horizontal axes and extending outward beyond the circumferential edge of the turntable, a cylindrical housing concentric with the turntable positioned above the turntable and said arms, an electric motor mounted in said housing with its output shaft radial with respect to the housing, support members securing said housing and said motor on said base, the housing having a roof, a pot having a spout and adapted to contain a liquid being removably mounted on said roof, means for positioning the pot on the housing with the spout in a given radial position with respect to the base, normally closed valve means in the pot between the interior of the pot and said spout, means partly on said shaft and partly on said turntable for intermittently rotating the turntable through an arc equal to the distance between successive cup-supporting arms and sequentially positioning said arms successively under the spout in a common vertical plane with the spout and for alternately opening and closing said valve during the time each of the arms is positioned under the spout while the motor is energized, and means for halting rotation of the turntable when a filled cup on one of said arms is moved into position antecedent the position under the spout, electric power leads into the device, a normally open first switch secured to said base including a switch actuating arm adapted to be depressed to close the switch by a cup-supporting arm plus the weight of an empty cup thereon, said actuating arm having a portion thereof projecting upward above the base and positioned in said vertical plane, said last-named means comprising a second normally closed switch secured to said base including a switch actuating arm adapted to be depressed to open the same having a portion thereof projecting upward above the base, said second switch including means resisting depression of the actuating arm thereof except by a force equal to the weight of the cup-supporting arm plus the weight of an at least partially filled cup thereon, the projecting portion of said second switch arm being positioned a distance of said arc from said first-named projecting portion measured in a direction opposite to the direction of rotation of the turntable, both of said projecting portions having their upper extremities lying in the circumferential path of movement of the cup-supporting arms for depression by an arm positioned thereover, said switches and said motor being connected in series across said power leads.

7. A device according to claim 6, said pot having an outlet well in the bottom thereof, said spout extending radially from said well, said well having a housing enclosing the same and provided with a downward extension below the bottom of the pot eccentric to the axis of the pot, said roof having a depression therein positioned eccentric to the axis of the roof complementary to said downward extension in which the extension registers.

8. A device according to claim 6, having means for releasably locking the pot to said roof.

9. A device according to claim 6, each of said switches including a pivot pin having the switch actuating arm thereof pivotally mounted on the pivot pin, said means resisting depression of the actuating arm of said second switch comprising a coiled spring surrounding the pivot pin thereof having one end fixed with respect to said base and having the other end thereof engaging the switch arm, and means for varying the tension of said spring.

10. A device according to claim 6, said roof having a depression spaced from said vertical plane and provided with a floor spaced below the roof, a thermostat assembly including a vertical member slidably mounted in one end of the floor, resilient means normally urging the member upward to a position wherein the top of the member is positioned above the level of the roof, a heat sensitive strip adapted to flex downward upon the application of heat thereto secured at one end thereof to said member between said floor and the top of the member extending outward from the member and normally positioned in the plane of the roof, a post slidably mounted in said floor under and in contact with the other end of the strip, the thermostat assembly further including two vertically spaced normally interengaged contact fingers lying in the vertical plane of the floor and the strip, the upper of said fingers being tensed to flex downward into contact with the lower of the fingers, the lower finger having a greater length than the upper finger and having said post extending upward therefrom, the fingers being connected in series with said switches, the weight of said pot when positioned on the roof depressing said member and hence lowering the thermostat assembly, said strip upon flexing downward pushing the post downward and when sufficiently heated pushing the post downward a distance sufficient to disengage the lower finger from the upper finger.

References Cited in the file of this patent
UNITED STATES PATENTS

| | | |
|---|---|---|
| 1,101,568 | Roberts | June 30, 1914 |
| 2,579,925 | Jackson | Dec. 25, 1951 |
| 2,604,249 | Gorham | July 22, 1952 |